United States Patent [19]

Nakano et al.

[11] Patent Number: 5,086,588
[45] Date of Patent: Feb. 11, 1992

[54] GLASS RUN FOR MOTOR VEHICLE

[75] Inventors: Shuji Nakano; Hisayuki Kisanuki, both of Inazawa, Japan

[73] Assignee: Toyoda Gosei Co. Ltd., Japan

[21] Appl. No.: 692,555

[22] Filed: Apr. 29, 1991

[51] Int. Cl.$^5$ .................................. E06B 7/16
[52] U.S. Cl. .................... 49/441; 49/479; 49/488
[58] Field of Search ............. 49/441, 440, 489, 479, 49/488

[56] References Cited

U.S. PATENT DOCUMENTS

| 4,470,223 | 9/1984 | Mesnel | 49/441 |
| 4,809,463 | 3/1989 | Schröder et al. | 49/441 X |
| 4,910,919 | 3/1990 | Kisanuki et al. | 49/441 X |

FOREIGN PATENT DOCUMENTS 63-64517 4/1988 Japan .

Primary Examiner—Philip C. Kannan

[57] ABSTRACT

A glass run to be attached to flanges of a door frame of a motor vehicle has a U-shaped main portion, seal lips extending from ends of the main portion inwardly for sandwiching a periphery of a door glass when being raised to its closed position, and outer lips extending from both ends of the main portion outwardly, turning upwardly and extending along both side walls of the main portion for holding the flanges of the door frame. One outer lip which is provided in the molded part of the glass run for holding an outer flange of the door frame has a projecting portion at a root portion thereof, which projects toward its facing side wall of the main portion. In the molded part of the glass run, the outer flange of the door frame is securely held between the projecting portion and its facing side wall of the main portion whereby the outer lip is stably attached to the door frame with good shape retention.

2 Claims, 3 Drawing Sheets

: 
GLASS RUN FOR MOTOR VEHICLE

BACKGROUND OF THE INVENTION

1. Field of the Invention

The present invention relates to a glass run to be attached along a door frame of a motor vehicle.

2. Description of the Prior Art

A glass run is attached to a door frame of a motor vehicle. When a door glass is in closed position, the glass run embraces a periphery of the door glass.

As shown in FIG. 5, the glass run is generally provided with a main portion 31 having a U-shaped cross-section, a pair of seal lips 35, 36, which respectively extend from both ends of the main portion 31 in such directions as to face each other for sandwiching the door glass, and outer lips 32, 33 which respectively extend form the both ends of the main portion 31 along the outer surfaces of both side walls of the main portion 31 (Japanese unexamined Utility Model publication No. sho 63-64517).

The glass run in composed of extruded parts, and at least one molded part which connects the extruded parts to each other and forms a corner portion of the glass run.

As shown in FIG. 4, along a door frame 1 of a motor vehicle except for a corner portion thereof, retainers 2 are provided for retaining the glass run.

The retainer 2 has a U-shaped cross-section, as shown in FIG. 5. Side walls of the retainer 2 are joined to flanges 13, 14 of the door frame 1, thereby forming double flanges 11, 12. In the retainer 2, the main portion 31 of an extruded part 3A is fitted. The double flanges 11, 12 are respectively sandwiched between the main portion 31 and the outer lips 32, 33.

As shown in FIG. 6, at a corner portion of the door frame 1, wherein no retainer exists, a molded part 3C is attached to the flanges 13, 14 of the door frame 1, each being a single flange thinner than the double flanges 11, 12. Accordingly, the molded part 3C cannot securely retain the flanges 13, 14, as compared with the extruded parts 3A, 3B.

The outer lip 32 to be located outside the door frame 1, serves as a moulding along the door frame 1. In order to improve the appearance around the door frame 1, the outer lip 32 is formed so that the outer surface thereof is substantially flush with that of the door frame 1.

At the corner portion of the door frame 1, the flange 13 of the door frame 1 is thinner than the double flange 11 (FIG. 5). This causes the formation of a considerably large gap 10 between the flange 13 and the outer lip 32, as shown in FIG. 6. Due to this gap 10, the posture of the outer lip 32 tends to be unstable so that the outer surface of the outer lip 32 is likely to be not flush with that of the door frame 1, or an end of the outer lip 32 is likely to open outwards with respect to the door frame 1.

These disadvantages are overcome by increasing the thickness of the outer lip 32. However, in this case, it becomes difficult to insert the flange 13 between the outer lip 32 and the main portion 1.

SUMMARY OF THE INVENTION

It is an object of the present invention to provide a glass run to be attached to a door frame of a motor vehicle, of which an outer lip covering the outer surface of an edge of the door frame is stably attached along a corner portion of the door frame with good shape retention.

The glass run in accordance with the present invention is provided with a main portion having a U-shaped cross-section, seal lips extending from both ends of the main portion in such directions as to face each other for sandwiching a periphery of a door glass when being raised to its closed position, and outer lips extending from both ends of the main portion outwardly, turning upwardly and extending along outer surfaces of side walls of the main portion for holding flanges of a door frame.

One outer lip provided in a molded part of the glass run, which is to be located outside the door frame, has a projecting portion at a root portion thereof. The projecting portion projects toward its facing outer surface of one side wall of the main portion so that the thickness of the root portion of the one outer lip is greater than that of a corresponding outer lip provided in an extruded straight part of the glass run. When, the flange of the door frame is inserted between the outer lip and the main portion, the projecting portion comes into pressure contact with the flange, whereby the outer lip is stably attached to the flange of the door frame with good shape retention.

BRIEF DESCRIPTION OF THE DRAWING

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Hereinafter, embodiments of the present invention will be explained in reference to the drawings.

Figure 1:
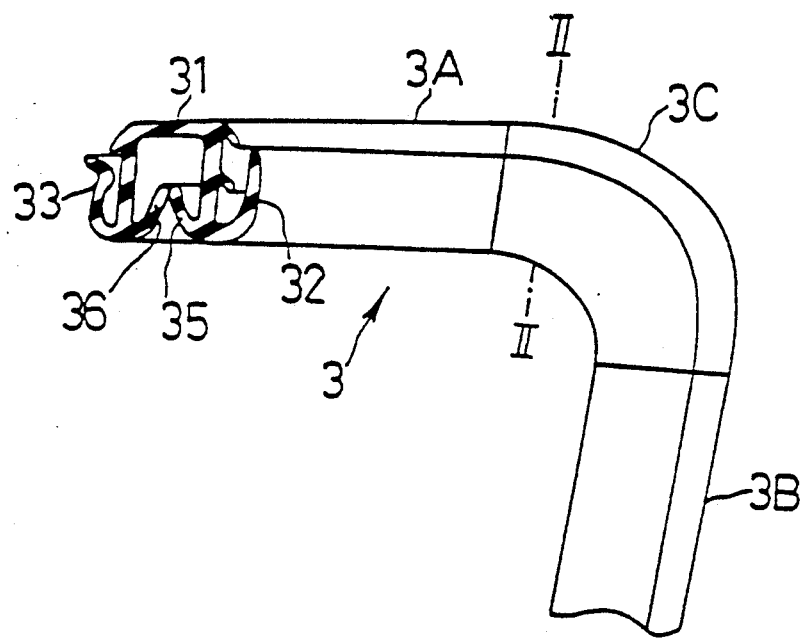
FIG. 1 is a partially sectioned perspective view of a first embodiment of a glass run in accordance with the present invention.
Figure 4:
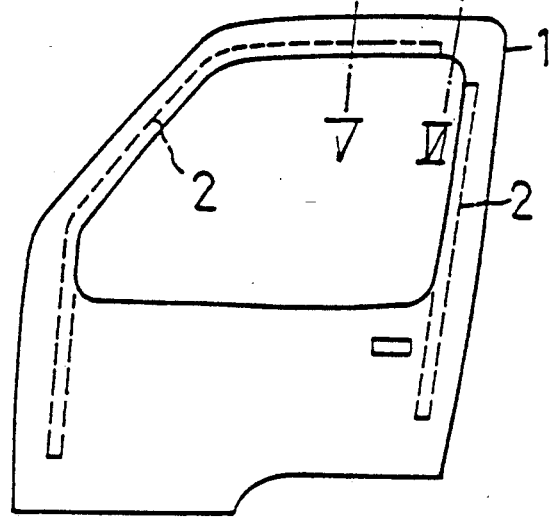
FIG. 4 is a front view of a door of a motor vehicle, to which the conventional glass run is attached.
Figure 5:
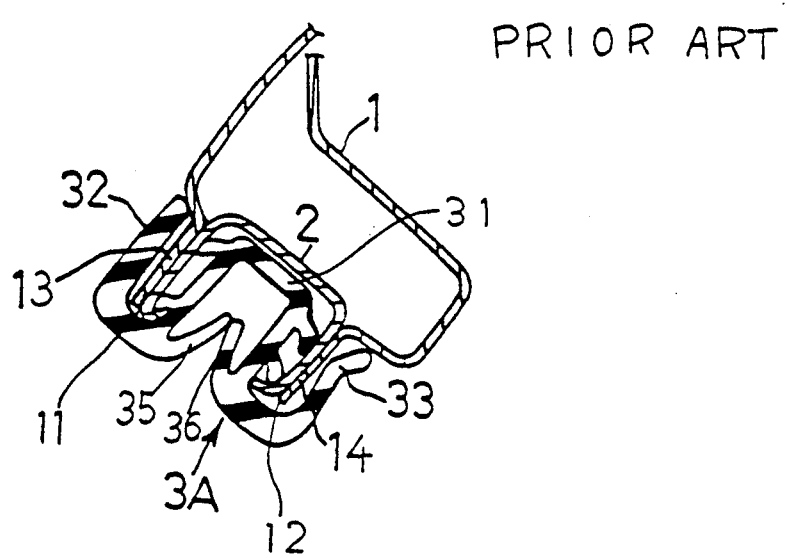
FIG. 5 is a cross-sectional view illustrating the attaching state of the conventional glass run to a door frame of a vehicle body, which is taken along the line V—V of FIG. 4.
Figure 6:
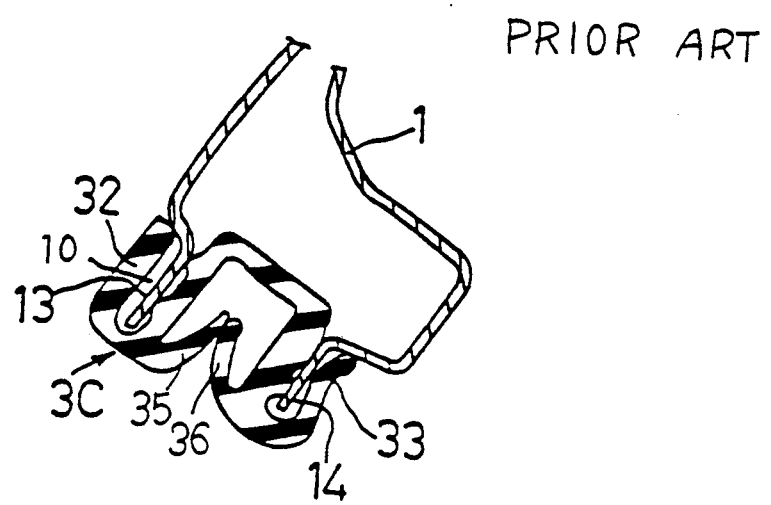
FIG. 6 is a cross-sectional view illustrating the attaching state of the conventional glass run to a door frame of a vehicle body, which is taken along the line VI—VI of FIG. 4.

Regarding FIG. 1 which illustrates a first embodiment of the present invention, extruded parts 3A, 3B of a glass run 3 respectively have seal lips 35, 36 which extend from both ends of a main portion 31 inwardly for sandwiching a door glass. Outer lips 32, 33 respectively extend from both ends of the main portion 31 outwardly and turn inwardly. These extruded parts 3A, 3B are joined with a molded part 3C for forming a corner portion of the glass run 3. The extruded parts 3A, 3B are respectively fitted in retainers 2 (FIG. 4) which are disconnected from each other at a corner portion of a door frame 1. The outer lip 32 to be located outside the door frame 1 has such a configuration that the outer surface thereof in the attaching state to the door frame 1, is flush with that of the door frame 1, similarly to the conventional glass run illustrated in FIG. 5.

Figure 2:
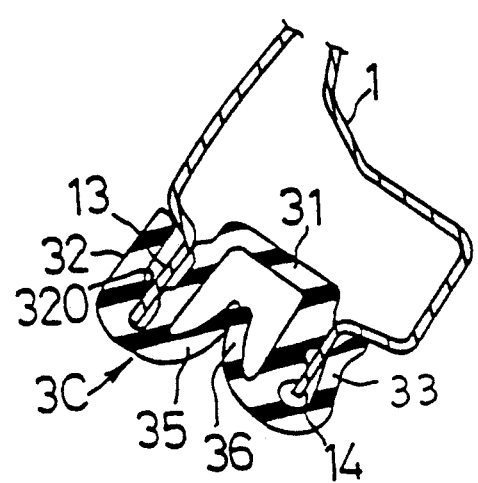
FIG. 2 is a cross-sectional view illustrating the attaching state of the first embodiment of the glass run to a door frame of a vehicle body, which is taken along the line II—II of FIG. 1.

FIG. 2 illustrates a corner portion of the glass run. In the molded part 3C which forms the corner portion, the seal lips 35, 36 and the outer lip 33 located inside the door frame 1, respectively have cross-sectional shapes substantially identical to those of the extruded part 3A, 3B. The cross-sectional shape of an upper half of the outer lip 32 of the molded part 3C is substantially identical to that of the upper half of the outer lip 32 of each of the extruded parts 3A, 3B. In the molded part 3C, a projecting portion 320 is formed in an inner surface of a root portion of the outer lip 32. This projecting portion 320 makes the thickness of the root portion of the outer lip 32 of the molded part 3C greater than that of the corresponding outer lips 32 of the respective extruded parts 3A, 3B. Between the projecting portion 320 and a facing side surface of the main portion 31, a narrow slit is formed.

The molded part 3C having the above construction is attached to the door frame 1 by inserting the flange 14 of the door frame 1 between the outer lip 33 and its facing side surface of the main portion 31, and inserting the flange 13 of the door frame 1 between the outer lip 32 and its facing side surface of the main portion 31 while pushing an end of the flange 13 into the narrow slit between the projecting portion 320 and its facing side surface of the main portion 31.

By virtue of the projecting portion 320, the rigidity of the root portion of the outer lip 32 is improved. When the molded part 3C is attached to the corner portion of the door frame 1, an end of the flange 13 of the door frame 1 is pressed on the rigid root portion of the outer lip 32. Accordingly, the outer lip 32 is stably attached to the door frame 1 with good shape retention. This causes the end of the outer lip 32 to be held flush with the outer surface of the door frame 1, and disadvantages encountered with the conventional glass run, such as the difference in level of outer surface between the outer lip 32 and the door frame 1, and the opening of an end of the outer lip 32 with respect to the door frame 1, can be overcome by the present embodiment.

Furthermore, the projecting portion 320 does not cause a lowering of efficiency in inserting work of the flange 13 into the glass run because the projecting portion 320 is formed only in the root portion of the outer lip 32.

Figure 3:
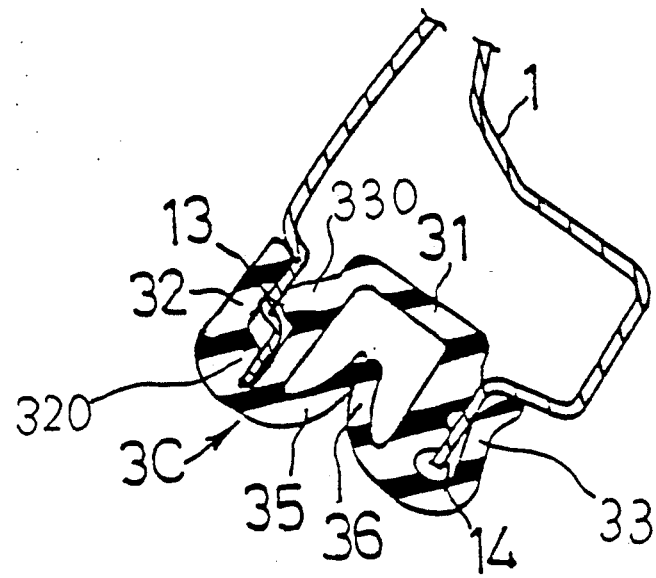
FIG. 3 is a cross-sectional view illustrating the attaching state of the second embodiment of the glass run in accordance with the present invention to a door frame of a vehicle body, which is taken similarly to FIG. 2.

Regarding FIG. 3 which illustrates a second embodiment of a glass run in accordance with the present invention, a projecting portion 320 is formed in the root portion of the outer lip 32 of the molded part 3C similarly to the preceding embodiment. In addition, another projecting portion 330 is formed in the side surface of the main portion 31 of the molded part 3C so as to face the end of the outer lip 32. The flange 13 of the door frame 1 has a stepped portion at a mid-length thereof, taking a Z-shaped cross-sectional shape. When the Z-shaped flange 13 is inserted between the main portion 13 and the outer lip 32, the outer surface of the end of the flange 13 comes into pressure contact with the projecting portion 320 formed in the outer lip 32 while the inner surface of the upper portion of the flange 13 comes into pressure contact with the projecting portion 330 formed in the main portion 31. With the second embodiment, the outer lip 32 is stably attached to the door frame 1 with good shape retention. Furthermore, the glass run of the second embodiment effectively prevents the flange 13 from coming out therefrom.

What is claimed is:

1. A glass run to be attached to flanges of a door frame of a motor vehicle, which is composed of extruded parts and at least one molded part connecting the extruded parts to each other and forming a corner portion of the glass run, comprising:

a main portion having a U-shaped cross-section;

seal lips extending from both ends of said main portion in such directions as to face each other for sandwiching a periphery of a door glass when being raised to its closed position; and outer lips extending from both ends of said main portion outwardly, turning upwardly and extending along an outer surfaces of both side walls of said main portion for holding the flanges of the door frame;

one of said outer lips provided in the molded part of the glass run, which is to be located outside the door frame, having a projecting portion at a root portion thereof, said projecting portion projecting toward a facing outer surface of one of said side walls of said main portion so that the thickness of said root portion of said one of said outer lips is greater than that of a corresponding outer lip provided in the extruded part of the glass run whereby said projecting portion and the facing outer surface of said side wall of said main portion define a narrow slit to which an outer flange of the door frame is to be inserted.

2. The glass run according to claim 1, wherein the distance between an end of said one of said outer lips, which is to be located outside of the door frame, and said facing outer surface of said side wall of said main portion is greater than the thickness of the outer flange of the door frame, and said root portion of said outer lip has such a thickness as to come into pressure contact with an end of the one flange of the door frame.

* * * * *